Patented July 12, 1938

2,123,246

UNITED STATES PATENT OFFICE 2,123,246

ABIETINYL-AMINO-ANTHRAPYRIMIDINES

Karl Koeberle and Otto Schlichting, Ludwig-shafen-on-the-Rhine, Germany, assignors to General Aniline Works, Inc., New York, N. Y., a corporation of Delaware No Drawing. Application February 3, 1937, Serial No. 123,863. In Germany February 13, 1936

5 Claims. (Cl. 260—32)

The present invention relates to organic compounds of high molecular weight.

We have found that organic compounds of high molecular weight having the following composition:

$$M-(A-X)_n$$

in which M stands for the radical of a compound having at least 3 condensed rings, A is an oxygen, sulphur, selenium, or nitrogen bridge which may also be part of a nucleus of the compound M, X is the abietinyl radical and $n$ is a whole number, are advantageously suitable for a great variety of uses.

The said new compounds may be prepared for example by causing compounds which contain a radical X at least once to react with cyclic compounds containing at least three nuclei, the starting materials being so chosen that one of them contains at least one reactive hydrogen or metal atom attached to oxygen, sulphur, selenium or nitrogen, and the other contains at least one atom or atomic group which allows of the replacement of the said reactive hydrogen or metal atom by the radical of the other initial material; or compounds of the composition $M'-(A-X)_n$, in which M' is the radical of any cyclic compound, may be converted into compounds of the composition given above by the joining on of rings to M'.

As initial materials for the process may be mentioned for example hydroxy, mercapto, seleno and primary and secondary amino derivatives of abietin. These compounds, if desired in the form of their salts, are caused to react with cyclic compounds containing at least three nuclei and containing exchangeable atoms or atomic groups. As such may be mentioned for example hydroxyl, halogen, nitro, sulphonic acid, acyloxy and alkoxy compounds of the acenaphthene, naphthalic acid anhydride, naphthalimide, anthracene, phenanthrene, pyrene, chrysene, carbazole, anthraquinone, azanthraquinone, benzanthraquinone, dibenzanthrone, isodibenzanthrone, perylene, dibenzoylperylene, perylene dicarboxylic acid ester, anthanthrone, anthanthrene, pyranthrone, benzanthrone, dibenzanthronyl, pyridinoanthraquinone, azabenzanthrone, anthraquinoneacridone, anthraquinoneazine, coeramidonine, anthrapyrimidine, anthrapyrimidone, anthrapyridine, anthrapyridone, coeroxene, coerthiene, oxazine, thiazine, pyrone, pyrazolanthrone and pyrroloanthrone series.

Furthermore compounds containing at least one reactive hydrogen or metal atom attached to an oxygen, sulphur, selenium or nitrogen atom may be caused to react with compounds of the composition X—Y in which Y is a halogen atom, some other exchangeable atom or an exchangeable atomic group. When the radical Y is present more than once, the exchange may be carried out a corresponding number of times whereby the radicals taking the place of Y may be different from each other. For example hydroxy, mercapto, seleno or amino compounds of anthraquinones, benzanthrones, anthanthrones, dibenzpyrenequinones and isodibenzpyrenequinones, perylenes, fluorenones, carbazoles, azabenzanthrones or other compounds containing at least three nuclei may be caused to react with a compound of the kind mentioned in the preceding paragraph.

The reaction of the initial materials may frequently be effected by simple heating. In many cases it is preferable to employ diluents and/or agents facilitating the reaction and/or agents which bind acids. As diluents may be mentioned for example high-boiling hydrocarbons, alcohols, ketones, halogen-hydrocarbons and nitro-hydrocarbons. In some cases it is advantageous to carry out the reaction in a closed vessel.

In the reaction of halogen compounds of the said kind, for example, it is preferable to add diluents of high boiling point and/or copper compounds and/or substances which bind acids. The reaction of hydroxy compounds is frequently facilitated by the addition of reducing agents, as for example sodium sulphite. In the reaction of nitro compounds it is advantageous to add substances which render any nitrous acid formed non-injurious.

The new compounds thus obtainable are usually obtained in good yields and in a very pure form. If desired they may be purified by the usual methods, as for example by crystallization, boiling with solvents, sublimation or by way of their salts with strong acids. Generally speaking they have a comparatively low melting point and are soluble very well in organic solvents, in particular in hydrocarbons and other substances which are not miscible, or which are only miscible with difficulty, with water. They may be used as dyestuffs, for the preparation of dyestuffs and for a number of other industrial purposes. Thus they are frequently especially suitable for dyeing and/or rendering fluorescent artificial resins, hydrocarbons, paraffin waxes, oils, waxes, rubber and similar natural and synthetic plastic masses as well as cellulose esters and ethers. The solubility of the compounds, and therefore their usefulness as additions to hydrocarbons and other similar compounds, increases with the number of the abietinyl radicals. Finally especially readily soluble compounds may be obtained by so selecting the initial materials that the final substance contains not only the abietinyl radical but also radicals of aliphatic or hydroaromatic hydrocarbons in any combination.

The following examples will further illustrate how the said invention may be carried out in practice but the invention is not restricted to these examples. The parts are by weight.

Example 1

A mixture of 12 parts of methoxypyranthrone (prepared by the methylation of hydroxypyranthrone which is obtained from aminopyranthrone by diazotization and exchange of the diazo group by a hydroxy group) and 50 parts of abietinylamine is heated to boiling in a stirring vessel until the color of the reaction mixture has become pure yellow. After cooling, the whole is taken up in dioxane, slight amounts of insoluble material are filtered off and methanol is added to the filtrate. The precipitated compound is filtered off by suction and washed with methanol. The abietinylamino - pyranthrone thus obtained is an orange powder which dissolves in concentrated sulphuric acid giving a blue coloration with a violet-red fluorescence. It is more difficultly soluble in alcohol and glacial acetic acid giving a yellow coloration with a green fluorescence. It is more readily soluble in acetone and very readily in ether, benzene and mineral oils giving a yellow coloration and a strong green fluorescence.

If hydroxypyranthrone be used instead of methoxy-pyranthrone, the same compound is obtained.

Compounds having similar proportion are obtained from methoxyanthanthrones, dihydroxyanthanthrones, hydroxy, alkoxy, or aryloxy compounds of allo-meso-naphthodianthrones, mesoanthra-dianthrones, dibenzanthrones, isodibenzanthrones, benzanthraquinones, benzanthrones, dibenzpyrenequinones, isodibenzpyrenequinones, anthraquinoneazines, flavanthrones, anthraquinonacridones, pyridinoanthraquinones and their reduction products.

Instead of the hydroxy compounds acetoxy or nitro compounds may also be employed.

If mercaptopyranthrone be heated in alkaline solution with abietinyl bromide the corresponding thio ether is obtained in good yield; from selenopyranthrones, the corresponding seleno compounds are obtained.

Similarly from hydroxy-azapyranthrones, as for example from hydroxy-Bz-monoazapyranthrones or hydroxy-Bz, Bz'-diazapyranthrones by heating with abietinylamine the corresponding abietinylamino-azapyranthrones are obtained and by heating with abietinyl bromide the corresponding abietinyl ethers are obtained. Similarly from mercapto compounds of azapyranthrones and abietinyl bromide the corresponding thio ethers are obtained and from the alkali selenides of azapyranthrones and abietinyl halides the corresponding selenium compounds are obtained.

Example 2

A mixture of 33 parts of 2-bromo-4-amino-1.9-anthrapyrimidine, 37 parts of abietinylamine, 10 parts of sodium acetate and 150 parts of amyl alcohol is heated to boiling in a stirring vessel until initial material is no longer present. The mixture is then diluted at about 80° C. with 150 parts of methanol and, after cooling, the yellow crystal pulp formed is filtered off by suction and the residue washed first with methanol and then with water. 4-amino-2-abietinylamino-1.9-anthrapyrimidine is thus obtained as a greenish yellow crystal powder which melts at from 170° to 175° C. It dissolves in concentrated sulphuric acid giving a red coloration which changes to violet-red on the addition of formaldehyde. It is soluble in organic solvents, in particular in ether, benzene and mineral oils giving a yellow color and a powerful yellow-green fluorescence.

If 2-hydroxy-4-amino-1.9-anthrapyrimidine or 4-amino-1.9-anthrapyrimidine-2-sulphonic acid be used instead of 2-bromo-4-amino-1.9-anthrapyrimidine, a compound having similar properties is obtained.

From the acylamines of 2-chlor- or 2-brom-4-amino-1.9-anthrapyrimidine and stearic, oleic, lauric, abietic, hexahydrobenzoic acid and abietinylamine, there are obtained specially readily soluble, very vividly fluorescing 2-abietinylamino-1.9-anthrapyrimidines which contain the corresponding acylamino groups in the 4-position. The acyl radical may also be subsequently introduced or the acylation may be carried out in one operation with the replacement of the halogen.

From 2-halogen-4-aryl-, -alkyl-, -aralkyl- or -cyclo-alkyl-amino-1.9-anthrapyrimidines and abietinylamine, 2-abietinylamino-4-aryl-, -alkyl-, aralkyl- or cycloalkyl-amino-1.9-anthrapyrimidines are obtained which are also readily soluble in hydrocarbons and artificial compositions and fluoresce strongly therein. Compounds of this kind which also contain hydroaromatic radicals of alkyl groups of high molecular weight in the joined-on aryl nucleus are especially readily soluble.

By heating 2,4-dihalogen- or 2.4-dihydroxy-1.9-anthrapyrimidines with at least 2 molecular proportions of abietinylamine, 2.4-diabietinylamino-1.9-anthrapyrimidines are obtained which are also extremely powerfully fluorescent and readily soluble in hydrocarbons.

From the sodium salt of 4-amino-1.9-anthrapyrimidine-2-selenide and abietinyl bromide there is obtained 4-amino-1.9-anthrapyrimidine-2-abietinyl selenide, from 4-amino-1.9-anthrapyrimidine-2-mercapto sodium salt and abietinyl bromide there is obtained 4-amino-1.9-anthrapyrimidine-2-abietinyl-sulphide and from 2.4-dibrom-1.9-anthrapyrimidine and abietinol in the presence of metallic potassium there is obtained the 2.4-diabietinyl ether of 1.9-anthrapyrimidine.

Example 3

25 parts of Bz2.Bz2'-dihydroxydibenzanthrone are introduced a little at a time at from 150° to 200° C. into 60 parts of abietinylamine while stirring well and the mixture is heated to boiling until its green color has completely changed to violet-red. After cooling to about 100° C. the mixture is diluted with 120 parts of dioxane, small amounts of undissolved matter are filtered off by suction and methanol is added to the filtrate whereby a violet-red powder separates. It is filtered off by suction, washed with methanol and dried. The compound dissolves in concentrated sulphuric acid giving a blue coloration and is readily soluble in organic solvents, especially in benzene and hydrocarbons, depending on the nature and amount of the solvent, giving a yellowish to bluish red coloration and a powerful olive-tinged yellow fluorescence.

If, instead of Bz2.Bz2'-dihydroxydibenzanthrone, the corresponding alkyl ethers are used, compounds having similar properties are obtained, tri- and tetra-hydroxydibenzanthrones may also be caused to react with abietinylamine or other amines of this kind.

*Example 4*

A mixture of 30 parts of leuco-1.4-dihydroxyanthraquinone, 100 parts of isobutyl alcohol and 35 parts of abietinyl amine is heated to boiling while stirring until a sample withdrawn no longer contains unchanged leuco compound. 5 parts of piperidine and 5 parts of copper acetate are then added and air is led through the mixture until the oxidation is completed. The whole is allowed to cool and the 1.4-diabietinylaminoanthraquinone obtained in the calculated yield in the form of blue needles is filtered off by suction. It is very readily soluble in benzene, benzine, paraffin, mineral oils and organic hydrocarbons giving a brilliant blue coloration, and soluble with somewhat more difficulty in glacial acetic acid, acohol and dioxane. The color of the solution in concentrated sulphuric acid is yellow.

The same compound can also be obtained by heating 1.4-dihydroxyanthraquinone itself in the presence of a reducing agent, such as sodium hydrosulphite, or leuco-1.4-dihydroxyanthraquinones with abietinylamine. For example heating of 20 parts of 1.4-dihydroxyanthraquinone, 5 parts of leuco-1.4-dihydroxyanthraquinone and 35 parts of abietinylamine in 200 parts of butyl alcohol leads to the same final product.

The compound may also be obtained by heating 1.4-dinitro-, 1.4-dimethoxy-, 1-hydroxy-4-methoxy- or leuco-1-amino-4-hydroxy-anthrayuinone with abietinylamine.

From leuco-1.4.5.8-tetrahydroxyanthraquinone and abietinylamine there is obtained diabietinylamino-dihydroxy-anthraquinone, and under more active conditions tri- or tetra-abietinylaminoanthraquinones. Similarly from 1.5-diamino-4.8-dihydroxyanthraquinone and abietinylamine there is obtained 1.5-diamino-4.8-diabietinylaminoanthraquinone and from 1.5-diamino-8-hydroxyanthraquinone there is obtained 1.5-diamino-8-abietinylaminonanthraquinone.

Other hydroxyanthraquinones may also be caused to react with abietinylamine, as for example 1-hydroxy-4-methylanthraquinone, 1.2-dihydroxyanthraquinone, 1.2.4-trihydroxyanthraquinone, 1.4.5.6-tetrahydroxyanthraquinone, 1-hydroxyanthraquinone-2-carboxylic acid, its esters and amides, 1-hydroxyanthraquinone-2-aldehyde and 2.3-dimethyl-5.8-dihydroxyanthraquinone.

From 1.4-diamino-2-bromanthraquinone and the sodium compound of abietinol, there is obtained the blue-colored 1.4-diaminoanthraquinone-2-abietinyl ether which is readily soluble in benzene and benzine.

*Example 5*

2 parts of 2-hydroxyanthracene are introduced while stirring at from 140° to 150° C. into 5 parts of abietinylamine and the mixture is heated for a short time to boiling. After cooling to about 100° C., the mixture is stirred with about 10 parts of dioxane, filtered by suction when cold and the residue washed with a little dioxane and methanol. 2-abietinylaminoanthracene is thus obtained in the form of a yellow crystal powder which dissolves in concentrated sulphuric acid giving a yellow coloration and a strong green fluorescence. It dissolves in organic solvents giving a yellow coloration and, depending on the nature of the solvent, a from blue to green fluorescence; for example the solution in paraffin oil has a pale blue fluorescence, in benzene a green-blue fluorescence, in ether and alcohol a blue-green fluorescence and in glacial acetic acid a green fluorescence.

From 1-hydroxyanthracene there is obtained 1-abietinylaminoanthracene. From 1-hydroxy-4-methoxyanthracene and abietinylamine there is obtained 1.4-diabietinylaminoanthracene which can also be obtained by the reduction of 1.4-diabietinylaminoanthraquinone (see Example 4) with zinc dust and caustic soda solution.

In a similar manner hydroxy compounds of hydrocarbons of high molecular weight and their derivatives react with abietinylamine to give readily soluble abietinylamino compounds, as for example hydroxybenzanthracenes, hydroxyacenaphthenes, hydroxypyrenes, hydroxychrysenes, hydroxyperylenes, hydroxyfluoranthenes, hydroxytriphenylenes and hydroxy compounds of heterocyclic compounds such as hydroxycarbazoles, hydroxydiphenylene oxides, 1.4.-dihydroxy-1-az-anthraquinones, hydroxyanthraquinoneazines, hydroxyanthraquinoneacridones, hydroxyphenazines, hydroxyperylene dicarboxylic acid imides and -imidazoles, hydroxycoeroxenes, hydroxycoeramidonines and hydroxyanthrapyrimidones.

*Example 6*

A mixture of 100 parts of perylenetetracarboxylic acid anhydride and 200 parts of abietinylamine is heated to boiling while stirring until unchanged acid anhydride can no longer be detected. The mixture is then allowed to cool and it is diluted at about 100° C. with 100 parts of dioxane. Perylenetetracarboxylic acid diabietinyldi-imide thus separates as a blue-red powder. It is separated in the usual manner and dried. It dissolves in benzene or other hydrocarbons giving a yellow coloration and a strong yellow-green fluorescence. The color of the solution in concentrated sulphuric acid is reddish blue with a vivid red fluorescence.

From halogenperylenetetracarboxylic acid anhydrides and abietinylamine there are also obtained abietinylamino derivatives of perylenetetracarboxylic acid diabietinyldi-imides which are distinguished by even more ready solubility in hydrocarbons.

Similarly from halogenperylenetetracarboxylic acid imides, alkylimides, arylimides or cycloalkylimides with abietinylamine there are obtained fluorescent, readily soluble compounds.

In a similar manner other peri-dicarboxylic acid anhydrides, as for example anthracene-1,9-dicarboxylic anhydrides, naphthalene-1.4.5.8-tetracarboxylic acid anhydrides, benzanthrone-peri-dicarboxylic acid anhydrides, azabenzanthrone-peri-dicarboxylic acid anhydrides, benzperylene dicarboxylic acid anhydrides, naphthalic acid anhydrides and acenaphthalic acid anhydrides react with abietinylamine. In a corresponding manner from halogen-containing compounds of the said kind there are formed substances which contain the abietinyl radical in amine-like or imide-like combination.

Instead of abietinylamine alone, a mixture of abietinylamine and another amino compound having an aliphatically combined amino group, for example dodecylamine or naphthenylamine, may be caused to react with compounds of the above-mentioned kind giving reaction products having similar properties.

Example 7

A mixture of 10 parts of 2.4-dibrom-1.9-anthrapyrimidone, 34 parts of abietinylamine and 40 parts of nitro-benzene is heated to boiling in a stirring vessel until initial material can no longer be detected. After cooling to 70° C. the mixture is diluted with 100 parts of dioxane, the compound formed is filtered off by suction after cooling and it is washed with dioxane and methanol. It is a brown resinous mass. The 2.4-diabietinyldiamino-1.9-anthrapyrimidone thus obtained dissolves in concentrated sulphuric acid giving a red coloration and a brown-green fluorescence. It is soluble in alcohol with difficulty and in benzene and mineral oils with ease giving a yellow coloration with a strong yellow-green fluorescence.

In a similar manner from dibromanthrapyridones and abietinylamine there are obtained abietinylaminoanthrapyridones, from halogencoeramidonines there are obtained abietinylaminocoeramidonines and from halogen pyrroloanthrones or halogen pyrazolanthrones there are obtained the corresponding abietinylamino compounds.

In addition to the exchangeable atoms or atomic groups, the said compounds may also contain other radicals, as for example alkyl, aryl, cyano or acyl groups.

Example 8

A mixture of 112 parts of dibrom-allo-*ms*-naphthodianthrone, 150 parts of abietinylamine, 100 parts of potassium carbonate, 10 parts of copper oxide and 500 parts of nitrobenzene is heated to boiling while stirring until a sample withdrawn no longer contains unchanged initial material. The mixture is then allowed to cool and the diabietinyldiamino-allo-*ms*-naphthodianthrone precipitated in the form of red-yellow needles is filtered off by suction. It is soluble with ease in benzene and other hydrocarbons giving a yellow-red coloration. The solutions have slight fluorescence.

In a similar manner from dibrompyridino-allo-*ms*-naphthodianthrones or from dibrom-*ms*-anthradianthrones, dibrom-aza-*ms*-anthradianthrones, dibromdibenzanthrones of from halogen compounds of anthraquinones, anthracenes, azaphenanthenes, anthraquinoneacridones, anthraquinonethioxanthones, benzanthrones, anthracene-peri-dicarboxylic acid imides, anthracene-peri-dicarboxylic acid imidazoles, pyrenes, chrysenes, perylenes or other polynuclear hydrocarbons there are obtained the corresponding abietinylamino compounds.

Instead of abietinylamine, N-methylabietinylamine may also be caused to react with halogen compounds of the above-specified groups of compounds.

Example 9

A mixture of 272 parts of 2-hydroxy-1.9.4.10-anthradipyrimidine and 400 parts of abietinylamine is heated to boiling while stirring. As soon as a sample withdrawn no longer contains hydroxyanthradipyrimidine, the excess of abietinylamine is distilled off under reduced pressure. 2-abietinylamino-1.9.4-10-anthradipyrimidine is thus obtained as a yellow powder which dissolves in concentrated sulphuric acid giving a red coloration. It dissolves in benzene or other hydrocarbons giving a yellow coloration; the solutions have a green-blue fluorescence.

The same compound is obtained by using 2-halogen-1.9.4.10-anthradipyrimidines instead of the 2-hydroxy compound. Similarly the treatment of 4-amino-2-abietinylamino-1.9-anthrapyrimidine with formamide leads to the same final product.

Instead of anthradipyrimidines there may also be used hydroxy or halogen compounds of anthracene derivatives which contain further rings joined on in the 1.9.4.10- or 1.9.5.10-position, as for example 1.9.4.10- or 1.9.5.10-anthradipyrimidones, -pyridones, -dicoeramidonines or anthrapyrimidinopyrimidones and -pyridones. Also in these cases, the second ring may be subsequently joined on. For example from 2-abietinylamino-4-amino-1.9-anthrapyrimidine there is obtained by heating with benzoyl acetic ester the corresponding 2-abietinylamino-1.9-anthrapyrimidinopyridone.

What we claim is:

1. A high molecular compound corresponding to the general formula

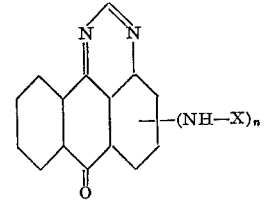

wherein X stands for the abietinyl radical, and n for a whole number from 1 to 2.

2. A high molecular compound corresponding to the general formula

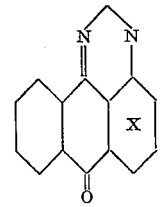

in which the nucleus marked X contains a group —NH—X, X being the abietinyl radical, and a group —NH—CO—Y, Y being a high molecular aliphatic hydrocarbon radical.

3. A high molecular compound corresponding to the general formula

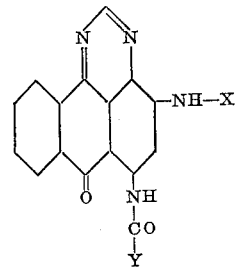

in which X stands for the abietinyl radical, and Y for a high molecular aliphatic hydrocarbon radical.

4. The high molecular compound corresponding to the formula

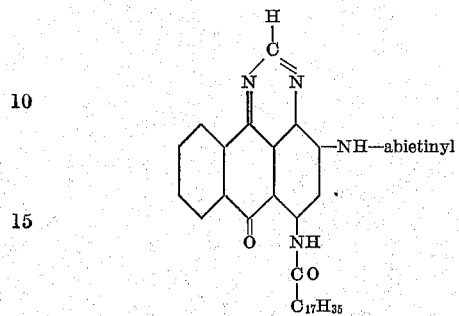

5. A high molecular compound corresponding to the general formula

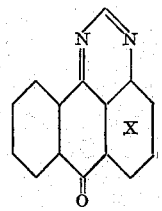

in which the nucleus marked X contains up to two groups selected from the class consisting of the group —NH—abietinyl and the group —NH—CO—Y, Y being a high molecular aliphatic hydrocarbon radical, at least one of the said groups being —NH—abietinyl.

KARL KOEBERLE.
OTTO SCHLICHTING.